Patented Oct. 14, 1941

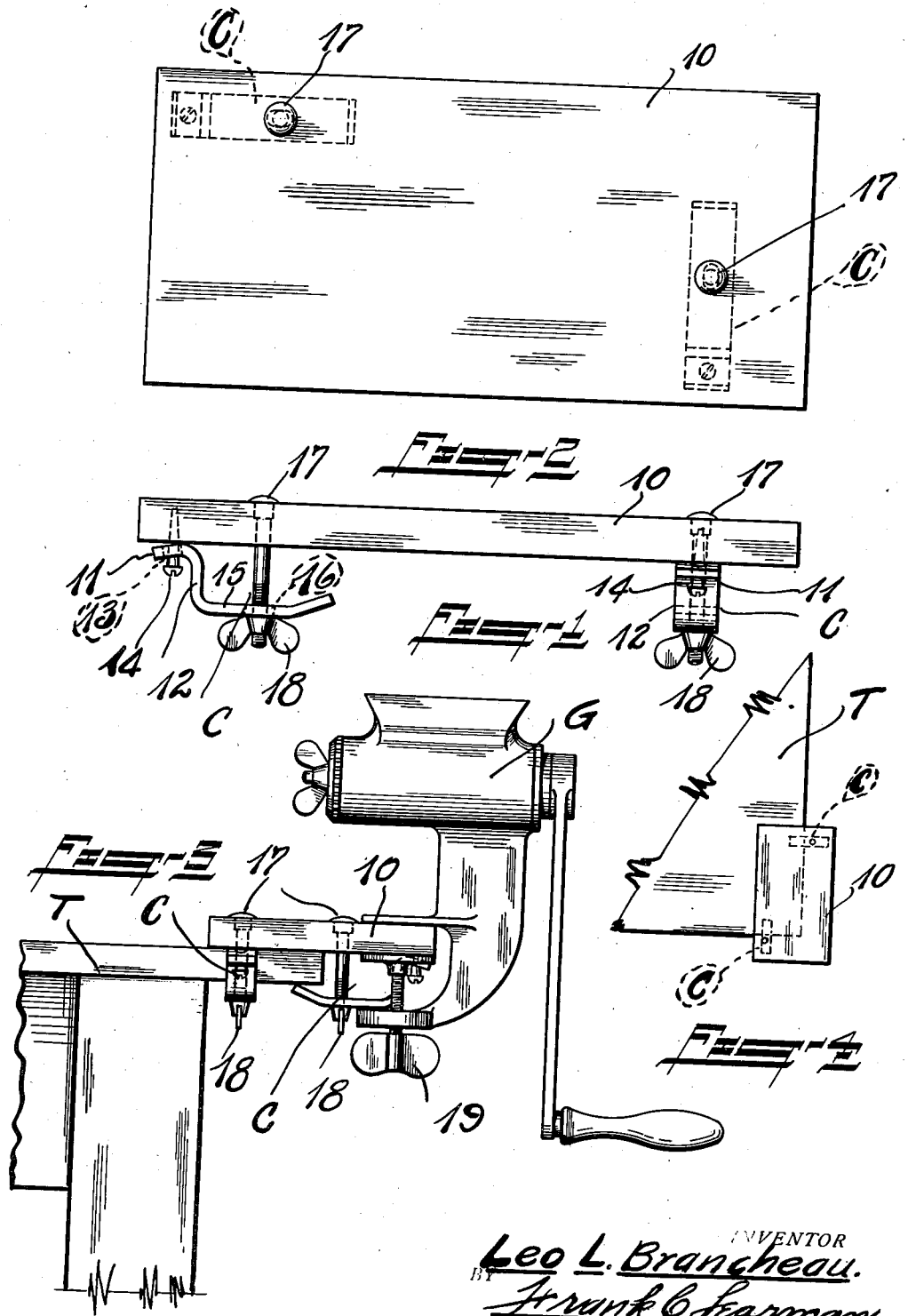

2,258,735

UNITED STATES PATENT OFFICE 2,258,735

DETACHABLE SUPPORT

Leo L. Brancheau, Bay City, Mich.

Application October 26, 1939, Serial No. 301,333

1 Claim. (Cl. 248—226)

This invention relates to detachable supports and more particularly to a support which can be removably secured to a table, cabinet, cupboard, or other similar article used in kitchens etc., so that meat grinders and devices of a like nature may be mounted and firmly secured thereon.

One of the prime objects of the invention is to design a simple, practical, and inexpensive support which can be quickly and easily attached or detached to the corner of a table, which is of neat and pleasing appearance, and which can be readily adjusted to suit the thickness of the member on which it is to be mounted.

Another object is to provide a very simple, detachable supporting member, which can be readily assembled and mounted, and which will not in any manner mar the surface of the structure to which it is attached.

A further object is to provide a support which can be firmly anchored in position, which can be conveniently stored in a drawer, and which can be compactly boxed for shipment or bulk storage.

A still further object is to provide a detachable support which can be rigidly secured in position and which forms a substantial support to which meat grinders and similar devices can be attached, thus preventing marring, cracking, or chipping of enameled surfaces such as occurs when meat grinders are mounted directly on tables and enameled surfaces.

With the above and other objects in view, the present invention consists in the combination and arrangement of parts, hereinafter more fully described; illustrated in the accompanying drawing, and more particularly pointed out in the appended claims, it being understood that changes may be made in the form, size, proportions, and minor details of construction, without departing from the spirit, or sacrificing any of the advantages of the invention.

In the drawing:

Fig. 1 is an edge view showing my detachable support.

Fig. 2 is a top plan thereof.

Fig. 3 is a fragmentary side elevational view showing my detachable support secured to a table and a meat grinder clamped in position thereon.

Fig. 4 is a fragmentary top plan view showing my detachable support attached to the corner of a table top.

It is a well known fact that it is difficult to find a suitable place in the home to which a meat grinder or similar device can be clamped, such devices must be rigidly secured in position and inasmuch as the clamping means on meat grinders is formed of metal, they usually mar the surface, and ofttimes crack the member to which they are secured, and when the grinder is clamped or mounted on metallic or enameled surfaces, it usually scratches and/or chips the enamel; if it is not rigidly mounted, the grinder twists and creeps to the general annoyance of the user, and this creeping or twisting action also scratches and mars the surface. Furthermore, there are but relatively few tables and cabinets which have edges which project sufficiently to fully accommodate and permit proper mounting of devices of the nature described, and I have therefore provided a support member, which can be readily fitted and rigidly mounted on the corner of a table, cabinet, or other structure, and which furnishes ample space for the mounting or clamping of a meat grinder or similar device thereon.

Referring now more particularly to the drawing in which I have shown the preferred embodiment of my invention. The reference numeral 10 indicates the support member which is preferably, but not necessarily formed of wood. This is formed to substantially the shape shown in Figs. 2 and 4 of the drawing.

The support includes a pair of clamps G mounted on the bottom face as shown, said clamps being formed of bar iron and are substantially angular in shape, the attaching end 11 being bent at right angles to the vertical portion 12 and is formed with a slotted opening 13 which loosely accommodates a screw 14 for securing the clamp to the board. This end 11 is curved to provide a rocking fulcrum or bearing for contact with the under-side of the support. The horizontally disposed free leg 15 is also bent at right angles to the portion 11 and it is provided with an opening 16 adapted to accommodate the bolt 17 which is anchored in the board, said opening being larger than the bolt to provide a sloppy fit, the free end of said leg being bent upwardly so that it readily grips the surface to which the board is clamped, a wing nut 18 being provided on the threaded end of the bolt and is manipulated to draw the clamp tightly against the structure on which the support is mounted.

Each of these clamps is identical in construction, but the location of these clamps on the support is of prime importance, one clamp being located so that it bears against the lower face of the side edge of a table top, while the opposite clamp is positioned so that the leg 15 bears against the lower face of one end of the table top, thus forming a rigid solid corner support which cannot shift and which is firmly held in position.

In Fig. 3 of the drawing, I have shown the support attached to a table T, with the free ends of the clamps engaging the bottom face of the projecting sections of the side and end of the table top, the wing nuts 18 being utilized to clamp the support in position. A meat grinder or other device G is shown clamped to the support 10 by means of an adjusting member 19, and it will be seen that there is ample space for this mounting and that any scratching or marring will affect the support only, and not the table top or other supporting structure, likewise there can be no chipping of metal or enamel surfaces as the support 10 provides ample bearing, and the clamps C engage the bottom face only of the structure.

It will of course be understood that the section 11 of the clamp C is slightly rounded to permit it to rock with relation to the board and as above noted the openings 13 and 16 are oversize so that the clamps can be adjusted to suit supporting sections of various thicknesses, and so that there will be no binding of the clamp with relation to the screw and bolt when the wing nut is manipulated to tighten the clamp.

From the foregoing description, it will be obvious that I have perfected a very simple, practical, and economical support which provides ample space for mounting household appliances such as meat grinders and similar devices, and which can be easily and quickly mounted and/or removed.

What I claim is:

The combination of an elongated base for an article and having a flat under-side, adjustable clamps arranged associated with the base at diagonally located points thereof adjacent to one longer and one shorter edge of said base, each clamp comprising a bar-like body having a substantially straight intermediate portion, an outer end portion at substantially right angles thereto with an apertured curved terminal for a rocking bearing and an inner end portion forming a biting jaw angled to said intermediate portion in the direction of the under-side of the base, a fastener freely engaged through the apertured terminal for loosely fastening it to the said base, and adjustable means on the base and engaged with the intermediate portion for adjustment of the bar-like body toward and away from the base for releasably biting engagement of the jaw, the said outer end portion being adapted to space the jaw from the under-side of the base and the apertured terminal with the cooperating fastener positively linking the clamp to the base.

LEO L. BRANCHEAU.